United States Patent [19]

Knop et al.

[11] Patent Number: 4,556,421
[45] Date of Patent: Dec. 3, 1985

[54] METHOD OF OPERATING A SYNTHESIS GAS-ORE REDUCTION PROCESS

[75] Inventors: Klaus Knop, Geldern-Hartefeld; Peter Heinrich, Oberhausen, both of Fed. Rep. of Germany

[73] Assignee: M.A.N. Maschinenfabrik Augsburg-Nürnberg Aktiengesellschaft, Fed. Rep. of Germany

[21] Appl. No.: 536,447

[22] Filed: Sep. 28, 1983

[30] Foreign Application Priority Data

Oct. 8, 1982 [DE] Fed. Rep. of Germany ....... 3237334

[51] Int. Cl.⁴ ............................. C22B 5/12; C10J 3/46
[52] U.S. Cl. ..................................... 75/91; 48/197 R; 75/35; 252/373
[58] Field of Search ................ 48/212, 213, 210, 203, 48/197 R, 196 R; 252/373; 75/35, 91; 266/156

[56] References Cited

U.S. PATENT DOCUMENTS

| | | | |
|---|---|---|---|
| 1,800,856 | 4/1931 | Bradley | 75/35 |
| 2,113,774 | 4/1938 | Schaalfeldt | 48/206 |
| 4,001,010 | 1/1977 | Kanbara et al. | 75/35 |
| 4,011,058 | 3/1977 | Johnson et al. | 48/210 |

FOREIGN PATENT DOCUMENTS 0799551 8/1958 United Kingdom .

Primary Examiner—Jay H. Woo
Assistant Examiner—Joye L. Woodard
Attorney, Agent, or Firm—McGlew and Tuttle

[57] ABSTRACT

A method of operating a cyclic synthesis gas-ore reduction process comprising supplying a carbonaceous material and preheated oxygen to a synthesis gas reactor to produce a hot synthesis gas, partially cooling said hot synthesis gas by directly passing the same through a regenerator and thereby storing the sensible heat of the hot synthesis gas in said generator. Further cooling said synthesis gas by reheating liquid for a vapor generator, and then reheating said further cooled synthesis gas and supplying it to an ore reduction reactor and generating a reduced product and an off gas. Directing the generated off gas to the synthesis gas reactor via said regenerator to heat the off gas to around 100° C. by transferring said stored heat.

9 Claims, 2 Drawing Figures

METHOD OF OPERATING A SYNTHESIS GAS-ORE REDUCTION PROCESS

FIELD AND BACKGROUND OF THE INVENTION

This invention relates in general to the method of operating reactors and in particular to a new and useful method of operating a synthesis gas reactor.

To improve the economy of the plant, German application P No. 32 23 702.2-41 (U.S. Ser. No. 505,330, filed June 17, 1983) provides for the heating of the circulating gas, before it reenters the synthesis gas reactor, with the waste heat of the reactor. The heat exchange between the hot synthesis gas and the cool recycled gas is effected in a waste heat exchanger.

Experience has shown that in the long run, the material of this heat exchanger cannot stand the action of the hot and corrosive synthesis gas. The flue dust entrained by the synthesis gas also contributes to the destructive effect on the material.

SUMMARY OF THE INVENTION

The present invention is directed to an improvement of the method disclosed by the mentioned application, eliminating these drawbacks.

In accordance with the method of the invention a reactor for producing synthesis gas is operated using a following ore reduction reactor. A partial stream of the off gas from the reduction reactor is used again in the synthesizing reactor. The sensible heat of the synthesis gas is partly recovered by heat exchange between the hot synthesis gas leaving the reactor and the cooled recycled gas entering the reactor. Synthesis gas which is cooled down in the regenerator is further cooled in a steam generator and, having been freed of flue dust, is subjected to a high temperature conversion and gas scrubbing, and then heated up and supplied to a reduction reactor for partial oxidation. Upon discharge from the reduction reactor it is heated up by a regenerator and recycled to the reactor along with preheated oxygen and carbon containing fuel. After the gas scrubbing a partial stream of the synthesis gas is subjected to a low temperature conversion and again to a gas scrubbing. The gas leaves the circuit as carburated gas to be used in further processes. At least a part of the steam amount formed in the steam generator is used for producing oxygen for the reactor. Nitrogen obtained during the oxygen production is used as a scavenging gas in the $CO_2$ scrubber. A part of the circulating gas is used along with coal dust for heating the gas stream entering the reduction reactor and for heating the stream of oxygen for the reactor for synthesizing.

Alternatively, a partial stream of the recycled synthesis gas may be branched off after the gas scrubber and subjected to a low-temperature conversion and again to gas scrubbing, and discharged as carburated gas for being used in other processes.

To still improve economy, at least a portion of the steam obtained in the steam generator may be used for producing oxygen for the reactor.

The apparatus for carrying out the inventive method advantageously comprises a regenerator, for exchanging heat between the recycled gas and the synthesis gas just leaving the reactor.

In contradistinction to conventional metal-tube heat exchangers, a regenerator can store the sensible heat of the synthesis gas just leaving the reactor where it is produced. Also, a regenerator is insensitive to the corrosive properties and dust contained in the synthesis gas.

Accordingly it is an object of the invention to provide an improved method of operating synthesis gas reactor.

A further object of the invention is to provide apparatus for carrying out the method of the invention which includes a reduction reactor, and means for recycling circulated gas from the reduction reactor to the synthesis gas reactor. Means are provided for admixing carbon containing fuel to the synthesis gas reactor and for introducing oxygen into the mixture of circulated gas and fuel. The construction includes a steam generator which is operated so that at least a preheating of the water therefore is supplied by the heat from the synthesis gas which is generated. A heat exchanger is employed for preheating the oxygen by using the generated synthesis gas which is cooled and used to preheat the water for the steam generator.

A further object of the invention is to provide an improved apparatus for carrying out the method of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
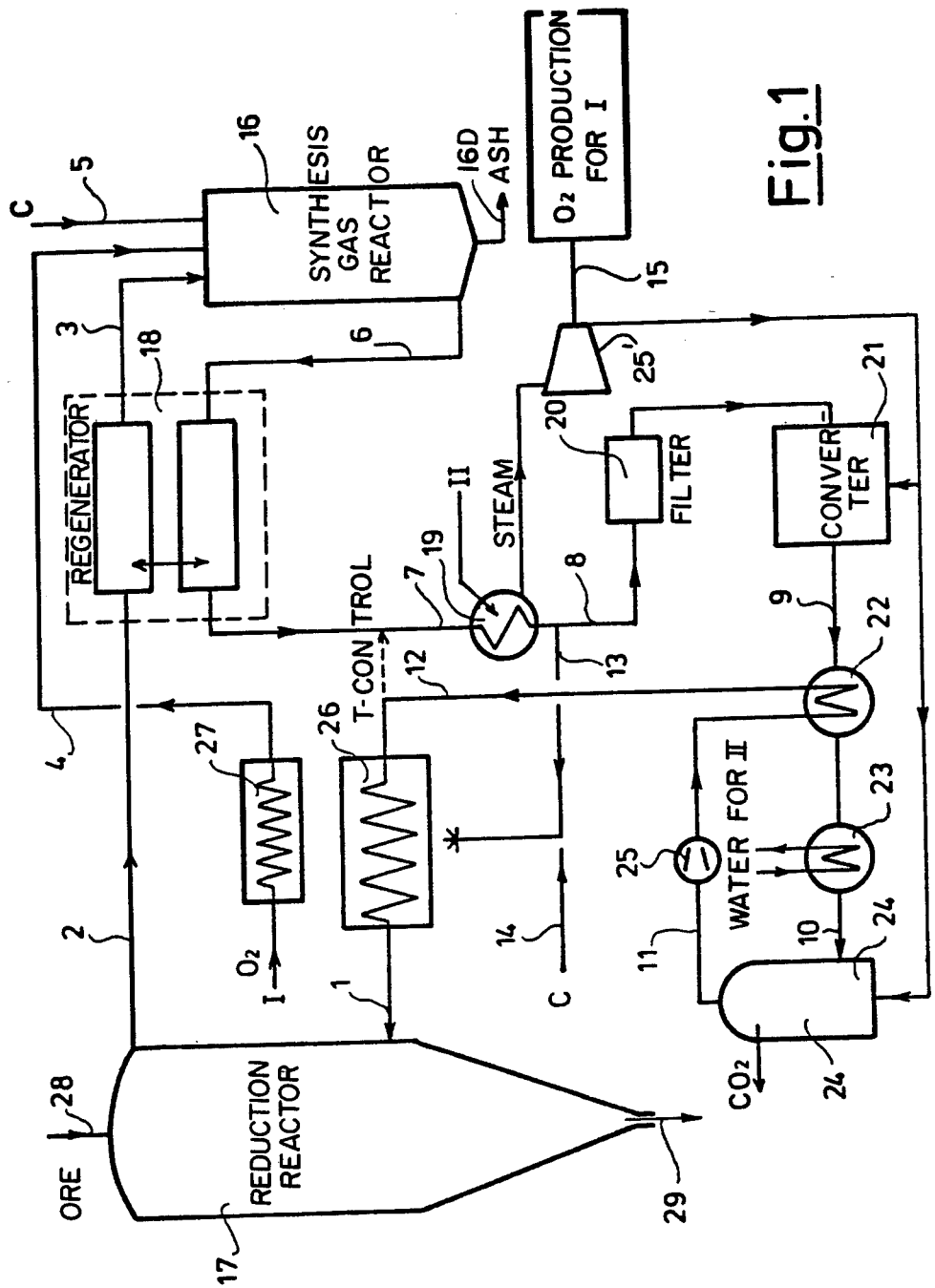
FIG. 1 is a diagram of a plant for producing synthesis gas to be used in an ore reduction reactor in accordance with the invention.

Referring to the drawings in particular the invention embodied therein comprises a method and apparatus for operating a synthesis gas reactor 16 using an off gas from a reduction reactor 17 which is first circulated through a regenerator 18 which is partly cooled by the synthesis gas which is generated.

As shown in FIG. 1, synthesis gas produced in reactor 16 in accordance with the inventive method is supplied over line 6 and is subject to processing (lines 7 to 12) and then supplied to a reduction reactor 17 over line 1, wherefrom it is recycled to reactor 16 over lines 2 and 3.

Synthesis gas reactor 16 is supplied through a line 5 with carbonaceous material in the form of coal dust. However, the carbonaceous material may also be supplied in the form of a gas or oil. Further supplied to reactor 16 through a line 4 is oxygen heated to 400° C., and through lines 3, the recycled gas which has been directed from reduction reactor 17 through regenerator 18 where it was heated up to 1100° C. (maximum 1200° C.). To heat the regenerator 18, a part of the sensible heat of the synthesis gas leaving reactor 16 on line 6 is used. Regenerators suitable for the inventive method, i.e. for removing heat from a hot gas stream, accumulating the heat, and then transferring the heat to another gas steam) are well known in the metallurgy and the glass industry, and need not be described in detail here.

In gasification reactor 16, the conversion takes place at temperatures between 1300° C. and 1500° C. The ash produced during the conversion is removed through discharge 16D at the bottom of the reactor. The synthesis gas leaves reactor 16 at line 6 with a temperature between 1200° C. and 1300° C., and in a composition according to table I, column 6. Upon passing through regenerator 18, wherefrom it comes out on line 7 with an average temperature of 750° C., the synthesis gas is cooled down to 300° C. in a heat exchanger 19 which is associated with a steam generator. The generated steam is used, by means of a turbine-driven compressor 25' with shaft 15, for producing the oxygen needed for the process. Excess steam may be employed in the power station of the plant. The nitrogen obtained during the oxygen production is used as scavenging gas in a $CO_2$ scrubber 24 of the synthesis gas circuit.

A part of the synthesis gas is branched off at 13, downstream of heat exchanger 19 and used along with coal dust on line 14 as a fuel for a waste gas heater 26. Waste gas heater 26 augments the temperature of the gas supplied into reduction reactor 17 on line 1 to about 920° C.

The gas which has not been directed through waste gas heater 26 passes on line 8 through a filter 20, or other equipment suitable for removing flue dust, into a high-temperature converter 21 serving the purpose of adjusting the optimum $H_2$—CO ratio. Downstream of converter 21, and on line 9, the gas has a composition according to column 9 of Table I.

Prior to entering a $CO_2$—$H_2S$ scrubber 24 on line 10, the gas heated up in high-temperature converter 21 is cooled in heat exchangers 22 and 23. Heat exchanger 23 heats boiler feed water which is supplied to heat exchanger 19. From $CO_2$—$H_2S$ scrubber 24, the gas is directed over line 11 to a compressor 25. Compressor 25 feeds heat exchanger 22 where the gas is preheated, to be supplied to waste gas heater 26. In waste gas heater 26, as already mentioned, the gas is further heated and then supplied to reduction reactor 17 on line 1 in a composition according to column 1 of Table I. The waste gas energy of heater 26 is still sufficient to heat, in addition and in a preheater 27, the oxygen needed for the operation of reactor 16.

In reduction reactor 17, into which ore is fed in a continuous process at 28 and the reduced product is removed at 29, the reduction gas is partly oxidized and then discharged from reactor 17 with a composition in accordance with column 2 of Table I. The off gas is conducted through a line 2 to regenerator 18, to be heated up, and then passes with a temperature of about 1100° C. into reactor 16.

To control the temperature of the hot synthesis gas leaving regenerator 18, cool synthesis gas from line 12 may be added line 7 as indicated in broken lines in FIG. 1.

Figure 2:
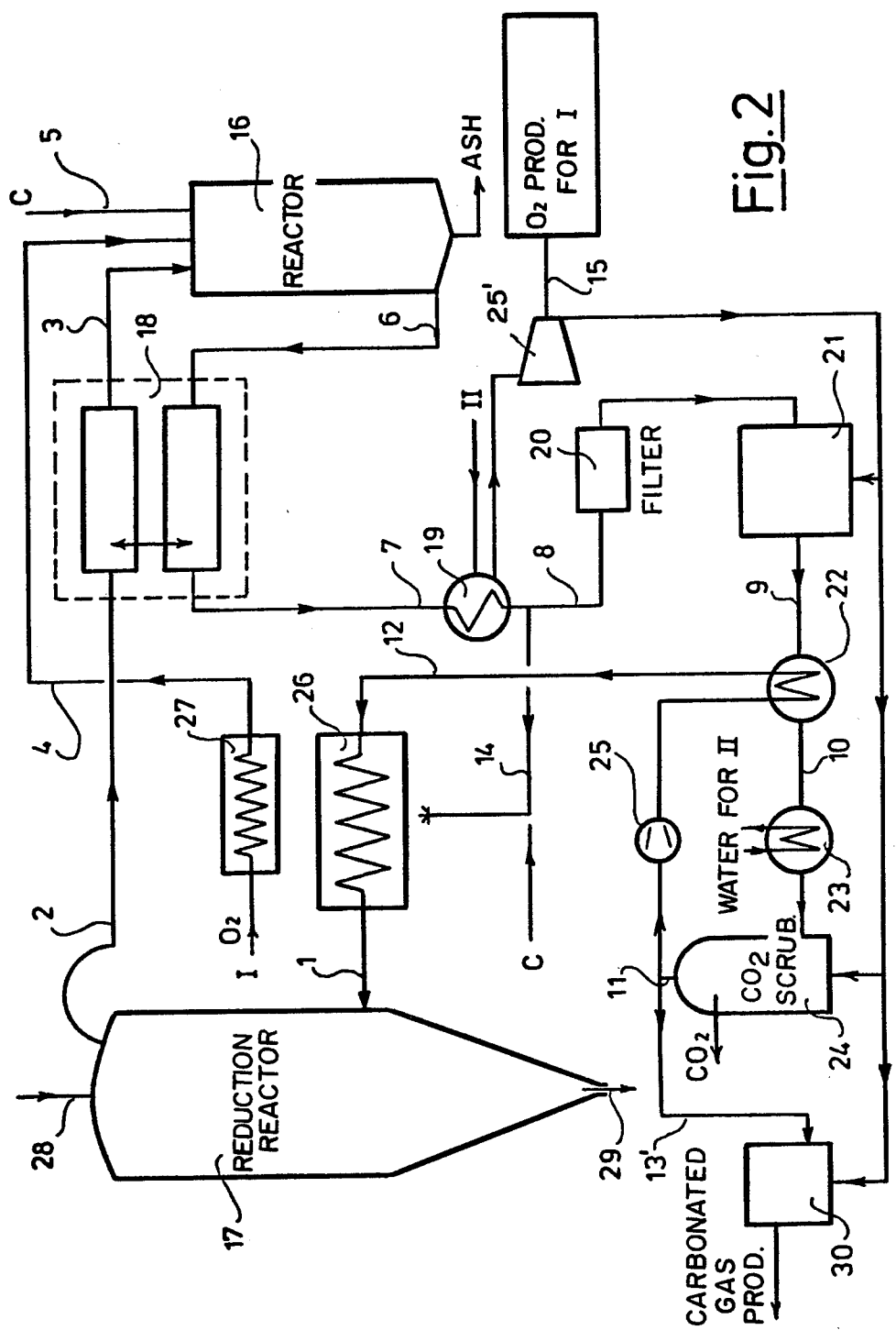
FIG. 2 is the same diagram but including elements for a carburated gas production.

According to FIG. 2, excess synthesis gas produced in accordance with the inventive method, may be removed from the circuit downstream of $CO_2$—$H_2S$ scrubber 24 and directed over line 13 through a low-temperature converter 30 and a following $CO_2$ scrubber (not shown). In the $CO_2$ scrubber 24, as already mentioned above, the nitrogen obtained during the oxygen production is used as the scavenging gas. The processed gas may be employed as carburated gas for ammonia production, or as a heating gas, for example.

Reference is made to the enclosed Table I which indicates the analysis and amounts of substances in the various gases.

While specific embodiments of the invention have been shown and described in detail to illustrate the application of the principles of the invention, it will be understood that the invention may be embodied otherwise without departing from such principles.

TABLE I

| Location | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| ANALYSIS AND AMOUNT | | | | | | | | | | | | | | | |
| $H_2$ (Vol. %) | 54.72 | 36.39 | 36.39 | | | 31.40 | 31.40 | 31.40 | 42.56 | 42.56 | 54.72 | 54.72 | 54.72 | 31.40 | |
| Co (Vol. %) | 36.60 | 23.28 | 23.28 | | | 48.53 | 48.53 | 48.53 | 28.46 | 28.46 | 36.60 | 36.60 | 36.60 | 48.53 | |
| $CO_2$ (Vol. %) | 3.00 | 15.82 | 15.82 | | | 6.31 | 6.31 | 6.31 | 20.26 | 20.26 | 3.00 | 3.00 | 3.00 | 6.31 | |
| $H_2O$ (Vol. %) | 5.00 | 22.96 | 22.96 | | | 13.17 | 13.17 | 13.17 | 8.19 | 8.19 | 5.00 | 5.00 | 5.00 | 13.17 | |
| $CH_4$ (Vol. %) | 0.00 | 0.72 | 0.72 | | | 0.00 | 0.00 | 0.00 | 0.00 | 0.00 | 0.00 | 0.00 | 0.00 | 0.00 | |
| $N_2$ (Vol. %) | 0.69 | 0.82 | 0.82 | | | 0.60 | 0.60 | 0.60 | 0.53 | 0.53 | 0.69 | 0.69 | 0.69 | 0.60 | |
| $O_2$ (kg) | — | — | — | 304 | — | — | — | — | — | — | — | — | — | — | |
| C (kg) | — | — | — | — | 340 | — | — | — | — | — | — | — | — | — | |
| $\Sigma C$ (kg) | 390.7 | 387.8 | 387.8 | | 340 | 727.8 | 727.8 | 710.2 | 710.2 | 710.2 | 448.7 | — | 57.9 | 17.6 | |
| $\Sigma H_2$ (kg) | 97.8 | 98.2 | 98.2 | | | 98.2 | 98.2 | 95.8 | 122.8 | 122.8 | | | | 2.4 | |
| $\Sigma O$ (kg) | | | | 304 | | | | | | | | | | | |
| $\Sigma N$ (kg) | | | | | | | | | | | | | | | |
| T (°C.) | 920 | 475 | 1100 | 400 | 20 | 1270 | 795 | 300 | 400 | 160 | | 400° | | | |
| P (bar) | 6 | 5.5 | 5.2 | 5.5 | 5.5 | 5.0 | 4.7 | | | | | | | | |
| M ($Nm^3$) | 1841 | 1815 | 1815 | 213 | 634 | 2476 | 2476 | 2416 | 2718 | 2718 | 2114 | 1841 | 273 | 60 | 220 |

What is claimed is:

1. A method of operating a synthesis gas reactor comprising:
   supplying a carbonaceous material to the synthesis gas reactor in addition to an oxygen stream so as to form a reaction producing a hot synthesis gas;
   adding ore to a reduction reactor and generating an off gas;
   directing the synthesis gas to a regenerator to partially cool said synthesis gas and thereby accumulate heat in said regenerator;
   directing the off gas to said regenerator to heat said off gas to above around 1100° C. by transferring said accumulated heat from said regenerator thereto;
   alternating the passage of the off gas and the synthesis gas through said regenerator so that the off gas always passes through a previously heated regenerator and the hot synthesis gas always passes through a previously cooled regenerator;
   using the partially cooled synthesis gas to reheat liquid for a vapor generator and thereby further cool said partially cooled synthesis gas;

reheating said further cooled synthesis gas and then supplying said reheated synthesis gas to the reduction reactor; and supplying the heated off gas from the regenerator to the synthesis reactor.

2. A method according to claim 1, wherein the further cooled synthesis gas is freed from flue dust, subjected to a high temperature conversion followed by gas scrubbing prior to reheating and supplying the synthesis gas to the reduction reactor.

3. A method according to claim 2, wherein the oxygen stream is preheated by mixing a portion of the further cooled synthesis gas from the vapor generator with a carbon containing fuel, burning the mixed gas and fuel to provide heat for a heat exchanger and passing said stream through said heat exchanger before it is supplied to the synthesis reactor.

4. A method according to claim 3, including using the vapor generator to drive a turbine for producing the oxygen stream.

5. A method according to claim 4, wherein nitrogen obtained during the oxygen production is used as a scavenging gas for the gas scrubbing.

6. A method according to claim 4, wherein the portion of the partially cooled synthesis gas is used along with the carbon containing fuel for heating the further cooled synthesis gas entering the reduction reactor.

7. A method according to claim 6, wherein the temperature of the partially cooled synthesis gas is controlled by adding to it some of the reheated scrubbed gas which is to be supplied to the reduction reactor.

8. A method according to claim 7, wherein the synthesis gas produced in the synthesis reactor has the following composition:

| Hydrogen | 27–36% |
| Carbon monoxide | 44–52% |
| Carbon dioxide | 5.6–6.9% |
| Water | 11.6–14.7% |
| Methane | 0–0.1% |
| Nitrogen | 0.4–0.8% |

The total of the components being 100%.

9. A method according to claim 7, wherein the processing of the synthesis gas results in a reduction gas of the following composition:

| Hydrogen | 49–60% |
| Carbon monoxide | 33–40% |
| Carbon dioxide | 2.7–3.3% |
| Water | 4.5–5.5% |
| Methane | 0–0.1% |
| Nitrogen | 0.6–0.8% | with the total components being 100%.

* * * * *